United States Patent
Creamer et al.

(10) Patent No.: US 7,099,445 B2
(45) Date of Patent: Aug. 29, 2006

(54) NAME-ALIAS BASED DELIVERY OF SUBSCRIBER SERVICES

(75) Inventors: Thomas E. Creamer, Boca Raton, FL (US); Peeyush Jaiswal, Boca Raton, FL (US); Victor S. Moore, Boynton Beach, FL (US); Scott L. Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/874,109

(22) Filed: Jun. 22, 2004

(65) Prior Publication Data

US 2005/0281401 A1    Dec. 22, 2005

(51) Int. Cl.
*H04M 1/56* (2006.01)
*H04M 15/06* (2006.01)

(52) U.S. Cl. .............................. 379/142.06; 379/88.21; 379/142.09; 379/245; 370/352; 370/356

(58) Field of Classification Search ........... 379/142.01, 379/127.01, 142.03, 142.04, 142.05, 142.06, 379/265.01, 265.09, 266.1, 88.19, 88.2, 88.21, 379/245; 455/415; 370/352, 356
See application file for complete search history.

(56) References Cited

U.S. PATENT DOCUMENTS

| | | | | |
|---|---|---|---|---|
| 5,274,699 A * | 12/1993 | Ranz | ..................... | 379/142.09 |
| 5,454,032 A | 9/1995 | Pinard et al. | | |
| 5,703,943 A * | 12/1997 | Otto | ..................... | 379/265.11 |
| 5,724,409 A * | 3/1998 | Malik et al. | ........... | 379/211.02 |
| 5,724,481 A * | 3/1998 | Garberg et al. | ............. | 704/243 |
| 5,754,630 A | 5/1998 | Srinivasan | | |
| 5,864,612 A * | 1/1999 | Strauss et al. | ......... | 379/142.03 |
| 5,901,209 A * | 5/1999 | Tannenbaum et al. | . | 379/142.09 |
| 5,903,636 A * | 5/1999 | Malik | ..................... | 379/142.01 |
| 6,134,315 A * | 10/2000 | Galvin | ....................... | 379/219 |
| 6,167,119 A | 12/2000 | Bartholomew et al. | | |
| 6,282,275 B1 * | 8/2001 | Gurbani et al. | ........ | 379/142.06 |
| 6,310,944 B1 * | 10/2001 | Brisebois et al. | ...... | 379/142.01 |
| 6,327,359 B1 * | 12/2001 | Kang et al. | ............ | 379/221.08 |
| 6,343,120 B1 * | 1/2002 | Rhodes | ................... | 379/142.01 |
| 6,389,117 B1 | 5/2002 | Gross et al. | | |
| 6,411,692 B1 * | 6/2002 | Scherer | .................. | 379/127.01 |
| 6,418,210 B1 * | 7/2002 | Sayko | .................... | 379/142.15 |
| 6,445,781 B1 * | 9/2002 | Heinmiller et al. | .... | 379/142.01 |
| 6,449,351 B1 * | 9/2002 | Moss et al. | ............ | 379/142.09 |
| 6,587,555 B1 | 7/2003 | Cripe et al. | | |
| 6,603,840 B1 * | 8/2003 | Fellingham et al. | ...... | 379/93.23 |
| 6,662,006 B1 * | 12/2003 | Glass | .......................... | 455/415 |
| 6,687,242 B1 * | 2/2004 | Enzmann et al. | ........... | 370/352 |
| 6,704,305 B1 * | 3/2004 | Emerson, III | ............... | 370/352 |
| 6,744,877 B1 * | 6/2004 | Edwards | ................ | 379/265.02 |
| 6,766,009 B1 * | 7/2004 | Williams et al. | ............ | 379/229 |
| 2005/0232246 A1 * | 10/2005 | Dowling | ..................... | 370/352 |

* cited by examiner

*Primary Examiner*—Binh K. Tieu
(74) *Attorney, Agent, or Firm*—Richard A. Tomlin, Esq.; Steven M. Greenberg, Esq.; Carey Rodriquez Greenberg & Paul, LLP

(57) ABSTRACT

A method, system and apparatus for name-alias based delivery of services through the public switched telephone network (PSTN). A method for resolving caller identity in a PSTN can include detecting an attempt to establish a telephone call between a calling party and a called party and prompting the calling party from within the PSTN for clarifying information. An alias for the calling party can be resolved based upon the clarifying information. Subsequently, the alias can be forwarded to the called party for use by the called party in identifying the calling party at the time of the telephone call.

13 Claims, 3 Drawing Sheets

NAME-ALIAS BASED DELIVERY OF SUBSCRIBER SERVICES

BACKGROUND OF THE INVENTION

1. Statement of the Technical Field

The present invention relates to delivering subscriber services for a telephone subscriber, and more particularly to providing user specific services to a single telephone identity in a public switched telephone network (PSTN).

2. Description of the Related Art

The intelligent network of today bears little semblance to the PSTN of old. In fact, the term "intelligence" has little to do with the operation of the conventional PSTN. Rather, the conventional PSTN of old incorporates a massive complex of switching matrices and transport trunks that, through the electronic equivalent of "brute force", forge the interconnections necessary to call completion. More particularly, for decades for every call processed the PSTN relied upon each successive switch to route a voice signal to the next. Still, the modern volume of calls processed within the conventional PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual transmission of a call. Consequently, with "out-of-band" signaling the PSTN has become "conscious" of the operations it is to perform prior to their execution. As a result, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), the Local Number Portability (LNP) database, the Toll Free Calling database and other databases containing additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs)—databases containing service logic and subscriber information—which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

The LIDB is a database configured for coupling to the PSTN through an SCP. The LIDB typically includes amorphous records arranged to store information regarding telephone callers, such as the name of the caller, the address of the caller, billing information for the caller, and the like. By storing invariable information regarding the caller, such as the name, address and billing method, many intelligent telephonic services can be provided over the PSTN through a simple query to the LIDB. In this regard, several local exchange carriers have deployed independent LIDB access services to facilitate the deployment of intelligent telephonic services which can exploit the invariant information stored within the LIDB.

Despite the wealth of information associated with a telephone caller stored in the LIDB, the LIDB seems to remain an untapped resource suitable only for advanced telephony billing applications. Accordingly, many conventional inconveniences remain prevalent in the world of the call center. For instance, though a name of a caller can be resolved prior to the completion of a phone call, in many cases, multiple names can be associated with a single telephone number. In particular, quite commonly both spouses and children all can be associated with a telephone number through which the individuals in a household can obtain services.

SUMMARY OF THE INVENTION

The present invention addresses the deficiencies of the art in respect to the resolution of the name of a calling party in a PSTN and provides a novel and non-obvious method, system and apparatus for name-alias based delivery of services through the PSTN. In accordance with the present invention, a method for resolving caller identity in a PSTN can include detecting an attempt to establish a telephone call between a calling party and a called party and prompting the calling party from within the PSTN for clarifying information. An alias for the calling party can be resolved based upon the clarifying information. Subsequently, the alias can be forwarded to the called party for use by the called party in identifying the calling party at the time of the telephone call.

In a preferred aspect of the present invention, the method of the invention can further include retrieving identifying information for the calling party from within the PSTN. Based upon the identifying information, it can be determined if multiple names are associated with the identifying information. In this regard, the prompting and resolving steps can be performed only if multiple names are associated with the identifying information. Otherwise, a single name associated with the identifying information can be assigned as the alias if multiple names are not associated with the identifying information.

A name-alias resolution system for resolving caller identity in a PSTN can include a telephone subscriber database disposed in a switch in the PSTN. The system also can include a name-alias resolution processor disposed in the switch and coupled to the database. Finally, the system can include a name resolution adapter disposed in the PSTN and coupled to each of the telephone subscriber database and name-alias resolution process in the PSTN, and to an subscribing services provider enterprise application over a data communications network. Notably, the telephone subscriber database can be a LIDB. Moreover, an interactive voice response system can be disposed in the switch and configured for interaction with calling parties.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for name-alias based identification of a caller in a PSTN for delivering subscriber services. In accordance with the present invention, a placed call within the PSTN can be processed by logic disposed within the PSTN to determine whether two or more names are associated with the identity of the caller for the placed call. If so, the caller can be prompted for clarifying information which can be passed to the called party concurrently with the completion of the placed call. In this way, the called party can identify the caller at the time of the placed call without first having to internally resolve the identity of the caller outside of the PSTN.

Figure 1:
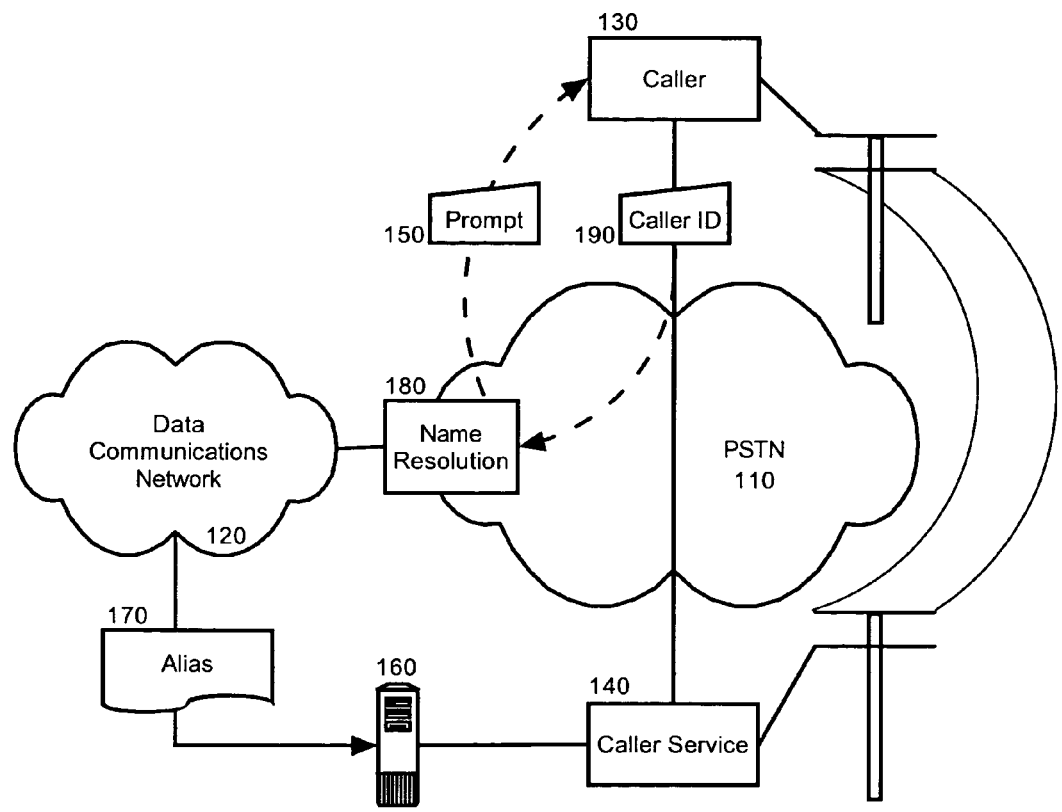
FIG. 1 is a block diagram illustrating a process for name-alias based delivery of services in a PSTN according to the inventive arrangements.

In further illustration, FIG. 1 is a block diagram illustrating a process for name-alias based delivery of services in a PSTN according to the inventive arrangements. Specifically, a caller 130 can be coupled telephonically to a subscribing services providing system 140 by way of the PSTN 110. The subscribing services providing system 140 can be a services provider configured to engage in a goods or services transaction with the caller 130. In particular, where the caller 130 is know to the services providing system 130, the services providing system 130 can include caller data associated with identifying information for the caller 130 such as the name of the caller 130. In this way, the services providing system 140 can provide an enhanced level of service to the caller 130 through the rapid retrieval of information for the caller 130 at the time the caller 130 calls the services providing system 140.

In more particular explanation, as the caller 130 initiates the telephone call in the PSTN 110, a name resolution adapter 180 disposed within the PSTN 110 can capture caller identifying data 190 for the telephone used by the caller 130 to place the telephone call in order to identify the caller 130. Using the caller identifying data 190, the name resolution adapter 180 can produce specific identification data for the caller 130, for instance a name, address, phone number, credit card number, or account number, to name a few. In this regard, the name resolution adapter 180 can query one or more databases disposed within the PSTN 110, including a LIDB, to obtain the specific identification data based upon the caller identifying data 190.

When the specific identification data has been acquired, it can be determined by or in association with the name resolution adapter 180 whether multiple specific identification records can be located based upon the caller identification data 190. If so, a prompt 150 can be issued to the caller 130 to provide more specific identifying information which can be used to resolve the specific identification record to be associated with the caller 130. In this regard, an interactive voice response system (not shown) can be utilized to issue voice prompts to the caller 130 and to process audible or DTMF responses by the caller 130. When the particular record has been determined, an alias 170 for the caller which has been associated with the particular record can be provided to an enterprise application 160 associated with the subscribing services providing system 140 over the data communications network 120. Concurrently, the call between the caller 130 and the subscribing services providing system 140 can be established over the PSTN 110.

Figure 2:
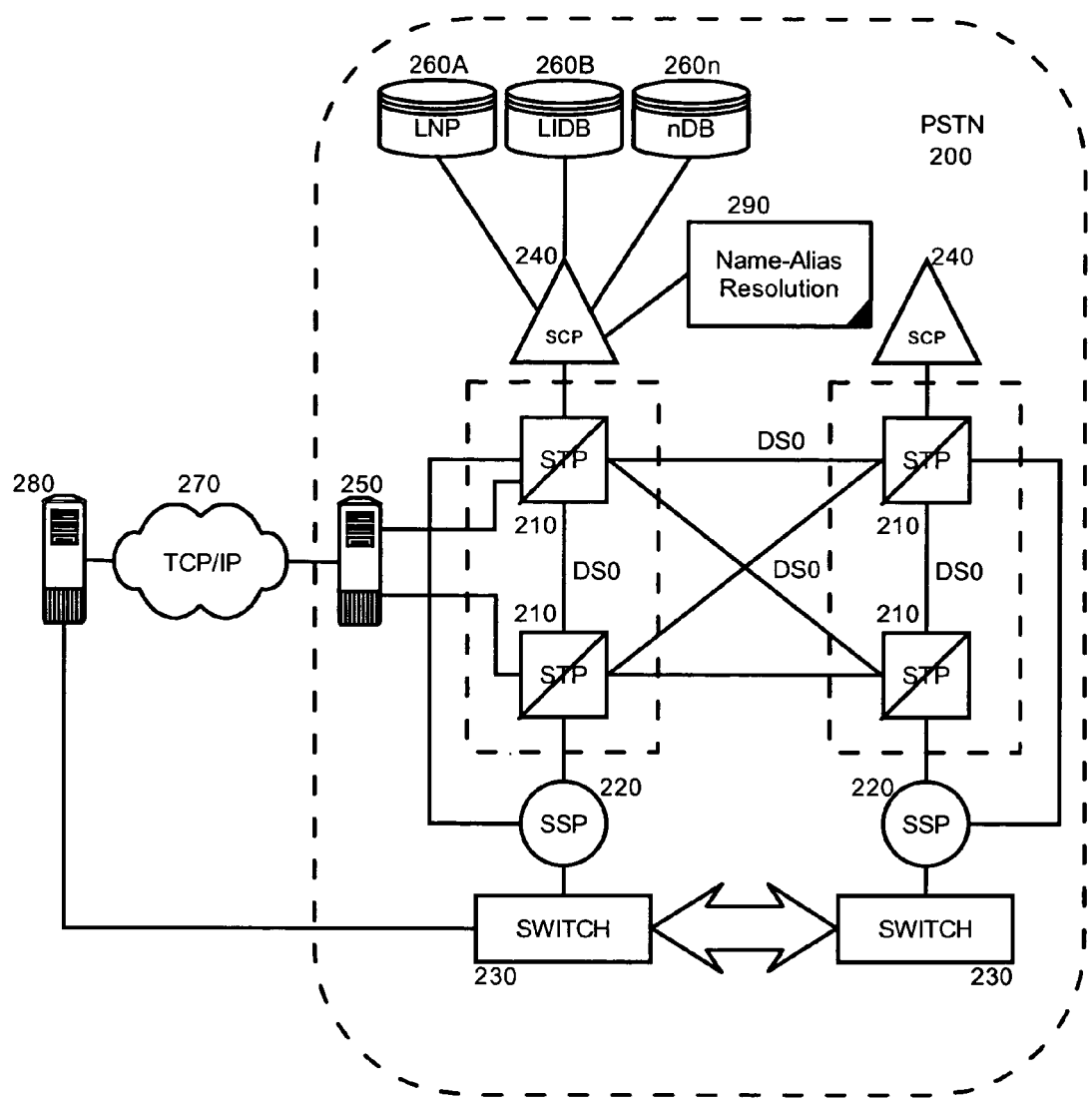
FIG. 2 is a schematic illustration of a system for name-alias based delivery of services using identifying information acquired within the PSTN; and, FIG. 3 is a flow chart illustrating a process for name-alias based delivery of services in the system of FIG. 2.

To further illustrate the preferred embodiments of the present invention, FIG. 2 is a schematic illustration of a system for name-alias based delivery of services using identifying information acquired within the PSTN. As shown in FIG. 2, a system for managing a guest service using identifying information acquired within a PSTN can include one or more telephonic switches 230 coupled to one another within a PSTN 200. Each of the switches 230 can be communicatively linked to a service switching point (SSP) 220 coupled to an out-of-band signaling network comprised of a multiplicity of signal transfer points (STP) 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art and embodied within the SS7 signaling network. The SCP 240 can be coupled to one or more databases 260A, 260B, 260n which can be configured to store invariant data such as the name, address and billing information for callers. For example, the databases 260A, 260B, 260n can include a local number portability (LNP) database, a LIDB, or any other such database which can be accessed within an SCP 240.

Notably, as is well-known in the art, the information stored within the databases 260A, 260B, 260n can be stored in amorphous records in nothing more than a flat file database, an object database or a relational database. In any event, through the communicative linkages between the SCP 240, the STP 210 and the databases 260A, 260B, 260n, transaction capabilities application part (TCAP) messages can be processed in the SCP 240 to access the invariant data in the databases 260A, 260B, 260n. In this way, calls processed through the switch 230 can access logic in the SCP 240 and data in the databases 260A, 260B, 260n through the SSP 220.

Notably, a name resolution adapter 250 can be coupled to the out-of-band network comprised of inter-connected STPs 210 to access data and logic through the SCP 240 through an exchange of messages such as TCAP messages. The name resolution adapter 250 can include a gateway node 250 having both an interface to the PSTN 200 and also an interface to a data communications network 270 such as an Internet Protocol driven network. In this way, data received through the PSTN 200, and more particularly from accessing the databases 260A, 260B, 260n in the PSTN 200 can be passed within IP packets to an enterprise application 280 over the data communications network 270. Also, as the enterprise application 280 can be coupled to a switch 230 within the PSTN 200 through an associated adapter, data disposed within the databases 260A, 260B, 260n regarding an incoming call can be processed within the enterprise application 280.

In operation, the name resolution adapter 250 can monitor calls placed to a switch 230 to which the enterprise application 280 has been coupled. As calls are received in the switch 230, the name resolution adapter 250 can receive respective TCAP messages from the STP 210 coupled to the switch 230. Using the TCAP messages, the name resolution adapter 250 can create additional TCAP messages to query the LIDB 260B to identify the callers. For each TCAP message querying the LIDB 260B, the LIDB 260B can return the identity of the caller, for instance the caller's name, or other identification such as caller's address. Once the name resolution adapter 250 has received the identity of the caller from the LIDB 260B, the name resolution adapter 250 can transmit the identity to the enterprise application 280 over the data communications network 270. The enterprise application 280 subsequently can correlate the caller identity received from the name resolution adapter 250 with a corresponding call received through the switch 230.

In a preferred aspect of the present invention, name-alias resolution logic 290 can be coupled to the SCP 240. The name-alias resolution logic 290 can be configured to resolve the identity of a caller based upon prompted information provided by the caller in the course of setting up a call between the caller and a subscribing service provider associated with the enterprise application 280. Based upon the resolved identity, an alias for the caller can be provided to the enterprise application 280 to further identify the caller to the enterprise application 280. In further illustration, FIG. 3 is a flow chart illustrating a process for name-alias based delivery of services in the system of FIG. 2.

Figure 3:
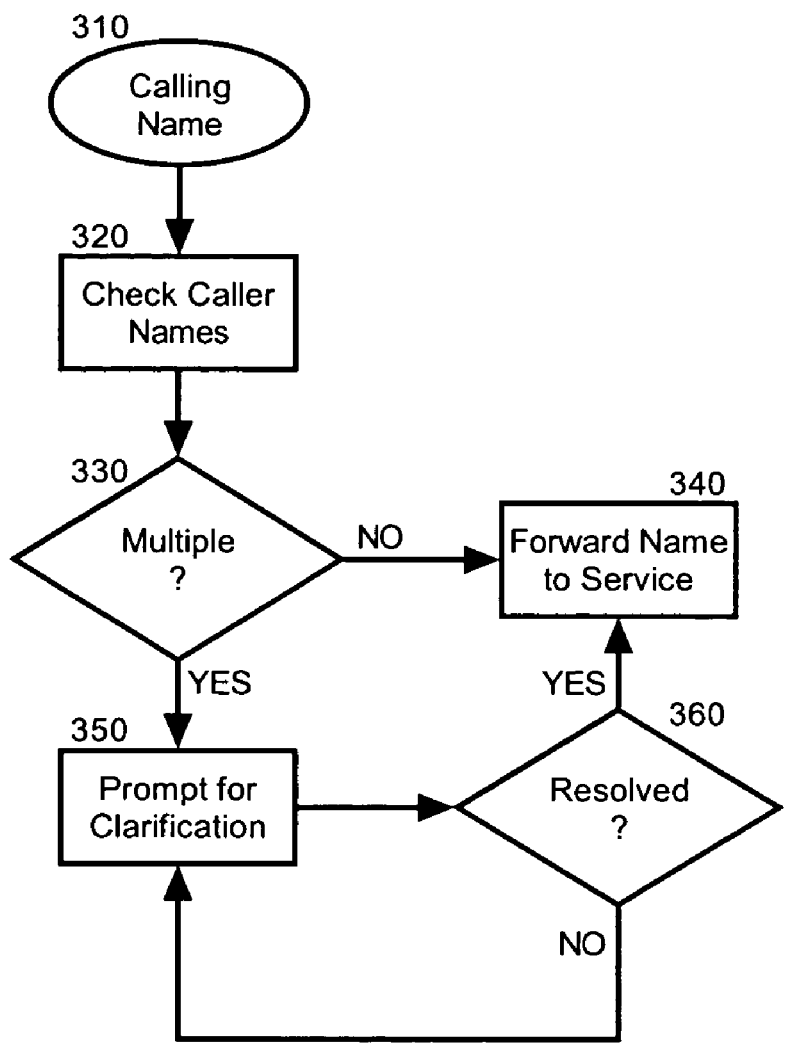

As shown in FIG. 3, beginning in block 310 a calling name for a calling party can be identified for an incoming call directed to a subscribing service provider in a switch disposed in the PSTN. The calling name can be identified, for instance, in reference to a table of names based upon the calling party telephone number. In block 320, the table of names to numbers can be consulted further and in decision block 330 it can be determined if multiple names resolve to the same incoming telephone number. If not, the name of the calling party can be forwarded to the subscribing service provider in block 340.

If in decision block 330 it is determined that multiple names resolve to the same incoming telephone number, in block 350 the calling party can be prompted for additional clarifying information, such as by listing the first names associated with the telephone number, or requesting the last four digits of a social security number, to name but a few. In decision block 360, it can be determined if the clarifying information suffices to resolve the identity of the calling party. If not, the calling party can be prompted for additional clarifying information in block 350. Otherwise, an alias for the calling party can be forwarded to the subscribing service provider in block 340. In this way, despite the multiple names associated with a single telephone number, the calling party can be identified for the benefit of the subscribing service provider at the time of the call.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for resolving caller identity in a public switched telephone network (PSTN), the method comprising the steps of:
   detecting an attempt to establish a telephone call between a calling party and a called party coupled to different sides of the PSTN;
   responsive to determining that multiple names resolve to an incoming telephone number for said telephone call, prompting said calling party from within the PSTN for clarifying information;
   resolving an alias for said calling party based upon said clarifying information; and,
   forwarding said alias to said called party over a data communications link established separately from a telephone link supporting the telephone call, wherein the data communications link originates in the PSTN and terminates with the called party.

2. The method of claim 1, wherein said prompting step comprises the steps of:
   retrieving identifying information for said calling party from within the PSTN;
   determining if multiple names are associated with said identifying information;
   performing said prompting and resolving steps only if multiple names are associated with said identifying information; and,
   assigning a single name associated with said identifying information as said alias if multiple names are not associated with said identifying information.

3. The method of claim 2, wherein said retrieving step comprises the step of retrieving a phone number for said calling party from said telephone call.

4. The method of claim 2, wherein said determining step comprises the steps of querying a line item database (LIDB) through a name resolution adapter disposed in the PSTN for names associated with said identifying information.

5. The method of claim 1, wherein said detecting step comprises the step of receiving a signaling system 7 (SS7)

message in a service control point (SCP) to set up a telephone call between said calling party and said called party.

6. A name-alias resolution system for resolving caller identity in a public switched telephone network (PSTN), the system comprising:
    a telephone subscriber database disposed in a switch in a public switched telephone network (PSTN);
    a name-alias resolution processor disposed in said switch and coupled to said database, said name-alias resolution processor comprising program code enabled to prompt a calling party from within the PSTN for clarifying information responsive to determining that multiple names resolve to an incoming telephone number for said telephone call and resolve an alias for said calling party based upon said clarifying information; and,
    a name resolution adapter disposed in said PSTN and coupled to each of said telephone subscriber database and name-alias resolution process in said PSTN, and to an subscribing services provider enterprise application coupled to the PSTN over a data communications link established separate from the telephone call, originating in the PSTN and terminating in the subscribing services provider enterprise application.

7. The system of claim 6, wherein said telephone subscriber database is a line item database (LIDB).

8. The system of claim 6, further comprising an interactive voice response system disposed in said switch and configured for interaction with calling parties.

9. A machine readable storage having stored thereon a computer program for resolving caller identity in a public switched telephone network (PSTN), the computer program comprising a routine set of instructions which when executed by a machine cause the machine to perform the steps of:
    detecting an attempt to establish a telephone call between a calling party and a called party coupled to different sides of the PSTN;
    responsive to determining that multiple names resolve to an incoming telephone number for said telephone call, prompting said calling party from within the PSTN for clarifying information;
    resolving an alias for said calling party based upon said clarifying information; and,
    forwarding said alias to said called party over a data communications link established separately from a telephone link supporting the telephone call, wherein the data communications link originates in the PSTN and terminates with the called party.

10. The machine readable storage of claim 9, wherein said prompting step comprises the steps of:
    retrieving identifying information for said calling party from within the PSTN;
    determining if multiple names are associated with said identifying information;
    performing said prompting and resolving steps only if multiple names are associated with said identifying information; and,
    assigning a single name associated with said identifying information as said alias if multiple names are not associated with said identifying information.

11. The machine readable storage of claim 10, wherein said retrieving step comprises the step of retrieving a phone number for said calling party from said telephone call.

12. The machine readable storage of claim 10, wherein said determining step comprises the steps of querying a line item database (LIDB) through a name resolution adapter disposed in the PSTN for names associated with said identifying information.

13. The machine readable storage of claim 9, wherein said detecting step comprises the step of receiving a signaling system 7 (SS7) message in a service control point (SCP) to set up a telephone call between said calling party and said called party.

* * * * *